United States Patent Office 3,557,247
Patented Jan. 19, 1971

3,557,247
ACRYLONITRILE GRAFT POLYMERS ON POLYAMIDE SUBSTRATE
Helmut Engelhard, Leverkusen, Francis Bentz, Cologne, and Ferdinand Bodesheim and Günther Nischk, Dormagen, Germany, assignors to Farbenfabriken Bayer Aktiengesellschaft, Leverkusen, Germany, a corporation of Germany
No Drawing. Filed Nov. 18, 1968, Ser. No. 776,787
Claims priority, application Germany, Nov. 28, 1967, F 54,137
Int. Cl. C08g 41/04
U.S. Cl. 260—857     2 Claims

ABSTRACT OF THE DISCLOSURE

This invention relates to acrylonitrile graft polymers having an improved affinity to acid dyes. The used graft substrates consist of linear polyamides containing at least one quaternized nitrogen atom for every two amide groups. The graft copolymers being prepared by polymerizing acrylonitrile together with other copolymerizable monomers in an aqueous medium, said polymerizing being effected in the presence of the linear polyamide as graft substrate and in the presence of a redox-catalyst system.

---

This invention relates to acrylonitrile graft copolymers which have an affinity to acid dyes, and to a process for preparing such copolymers by grafting linear polyamides which contain quaternised nitrogen atoms with acrylonitrile, if desired together with other copolymerisable monomers.

Filaments and yarn produced from acrylonitrile homopolymers, and from copolymers of acrylonitrile with neutral comonomers usually have insufficient affinity to dyes for practical purposes.

It is already known that the affinity of acrylonitrile homopolymers and copolymers to acid dyes can be increased by copolymerisation with unsaturated amines such as vinyl pyridines, monovinyl ethers of amino alcohols or (meth)acrylic acid amides which contain tertiary amino groups, e.g. N-(3-dimethylaminopropyl)acrylamide.

Although copolymers prepared in this way can be dyed with acid dyes, they frequently have low K-values so that the films and filaments produced from them have insufficient mechanical strength and are only of limited commercial value. Furthermore, the copolymers undergo fairly severe discoloration on heating, both in solution and in solid form.

Graft polymers of acrylonitrile and polyamides, e.g. nylon 6, which have an improved affinity to acid dyes, are also known.

We have now produced acrylonitrile graft copolymers which contain at least 50% by weight of acrylonitrile and, if desired, up to 10% by weight of another olefinically unsaturated comonomer containing acrylic or vinyl groups grafted on, 5–40% by weight of a linear polyamide which contains quaternised nitrogen atoms and has the recurrent structural unit

—C—R—C—NH—R₁NH—
‖      ‖
O      O in which R denotes an alkylene radical containing 2 to 10 carbon atoms or a radical of the formula

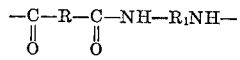

in which $z$ is an integer of from 2 to 6, $R_2$ represents an alkyl radical containing 1 to 6 carbon atoms or a cycloalkyl radical, $R_3$ represents a methyl or ethyl group, and $A^{(-)}$ represents a halide, sulphate and sulphonate anion, and $R_1$ represents an alkylene radical containing 2 to 6 carbon atoms, or a radical of one of the following formulae:

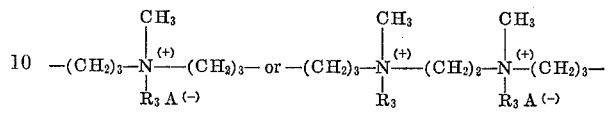

in which $R_3$ and $A^{(-)}$ have the meanings indicated above, the polyamides containing at least one quaternised nitrogen atom for every two amide groups and having a molecular weight of 1,000 to 50,000, the graft polymer so formed having a K-value (according to Fikentscher, Cellulosechemie, 13 (1932), p. 58) of from 70 to 110.

The acrylonitrile graft polymers are characterised by the following recurrent structural unit:

—C—R—C—NH—R₁—NH—
‖      ‖          
O      O          
X      X in which R represents an alkylene radical containing 2 to 10 carbon atoms or a radical of the formula

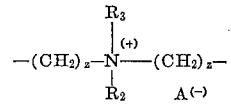

in which $z$ is an integer of from 2 to 6, $R_2$ represents an alkyl containing 2 to 6 carbon atoms or a cycloalkyl radical, $R_3$ represents a methyl or ethyl group and $A^{(-)}$ represents a halide, sulphate or sulphonate anion, $R_1$ represents an alkylene radical containing 2 to 6 carbon atoms, or a radical of one of the following formulae:

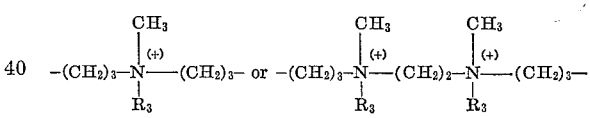

in which $R_3$ and $A^{(-)}$ have the meanings indicated above, and X represents a side chain consisting of polymerised acrylonitrile and, if desired, another olefinically unsaturated comonomer containing acrylic or vinyl groups, the main polyamdie chain having a molecular weight in the region of 1,000 to 50,000 and the graft polymer having a K-value (according to Fikentscher, Cellulosechemie, 13 (1932), p. 58) in the region of 70 to 110.

A process for the preparation of these acrylonitrile graft polymers has furthermore been found, wherein acrylonitrile, if desired together with other comonomers, is grafted on to linear polyamides which contain at least one quaternised nitrogen atom for every 2 amide groups, in the presence of radical forming catalysts in an aqueous medium at temperatures of 0 to 90° C.

The polyamides which are used as graft substrates for the graft polymers according to the invention and which contain quaternised nitrogen atoms and have a molecular weight of 1,000 to 50,000 are prepared by known processes, e.g. by reacting stoichiometric quantities of diamines which contain tertiary nitrogen atoms and dicarboxylic acids in the melt, if necessary with the addition of water, and then carrying out quaternisation with the usual quaternising agents. The dicarboxylic acids used in this preparation may also contain tertiary nitrogen atoms.

Diamines or dicarboxylic acids which do not contain any quaternisable nitrogen atoms in the molecule may, of course, also be used in minor quantities in the polycondensation.

The following compounds are examples of suitable diamines which contain tertiary nitrogen atoms: N,N'-dimethyl-N,N'-di-(γ-aminopropyl) - ethylene diamine, N-methyl-N-di-(γ-aminopropyl)amine; in addition, simple diamines such as ethylene, propylene or butylene diamine etc. may be included.

Dicarboxylic acids which may be used in the polycondensation are those of the general formula $$HOOC-R-COOH$$

in which R represents an alkylene radical containing 2 to 10 carbon atoms (dicarboxylic acids in which R contains 3 to 6 carbon atoms are preferably used) or dicarboxylic acids of the general formula $$HOOC-(CH_2)_z-N-(CH_2)_zCOOH$$
$$\qquad\qquad\qquad |$$
$$\qquad\qquad\qquad R_2$$

in which z is an integer of from 2 to 6, preferably 2, and R represents an alkyl radical containing 1 to 6 carbon atoms or a cycloalkyl radical.

Quaternisation of the polyamides which contain a tertiary nitrogen atom can be carried out by the usual methods, in alcohol or mixtures of alcohol and water, using known quaternising agents such as dimethylsulphate, methyl p-toluene sulphonate, propane sultone, methyl iodide, benzyl chloride, ethyl chloroacetate or allyl chloride. The quaternisation products need not be isolated. The aqueous solution resulting from the process of preparation can be used directly for graft polymerisation, if desired after removal of the alcohol contained therein.

The polyamide obtained when a polyamide prepared from adipic acid and N-methyl-N-di-(γ-aminopropyl)-amine is quaternised with dimethylsulphate, for example, contains the following recurrent structural unit:

$$\left[-NH-(CH_2)_3-\overset{\overset{CH_3}{|}}{\underset{\underset{CH_3CH_3SO_4}{|}}{N^{\oplus}}}-(CH_2)_3-NH-CO-(CH_2)_4-CO-\right]$$

The compounds used as the substrate for the graft contain at least one quaternised nitrogen atom for every two amide groups because such graft substrates impart by far the best dyeing properties to the graft polymers. The graft polymerisation of acrylonitrile on quaternised graft bases is advantageously carried out in the presence of up to 10% by weight of other copolymerisable olefinically unsaturated compounds. Suitable unsaturated compounds for this purpose are, for example, vinyl acetate, (meth)acrylic acid ester, vinyl chloride or an acrylamide. The solubility of the polymers and their dyeing properties can thereby be improved. The quantity of graft substrate in the total weight of polymerisable reactants is 5 to 40%, preferably 10 to 20%, based on the non-quaternised polyamide.

Graft polymerisation in the aqueous phase is advantageously carried out using water-soluble catalysts which form free radicals, such as peroxides, azo compounds or Redox systems based on per compounds and sulphur compounds in low stages of oxidation, e.g. potassium sulphate, sodium sulphate or ammonium sulphate together with sulphur dioxide, alkali metal hydrosulphites, alkali metal pyrosulphites or alkali metal thiosulphates. Quantities of 0.5 to 5% by weight, based on the total weight of the monomers, are used. The ratio of oxidising to reducing agent is preferably from 1:0.5 to 1:10. A 5 to 15-fold quantity of water is used. The temperature range in which aqueous polymerisation may be carried out is 20 to 90° C., preferably 40 to 65° C.

Aqueous graft polymerisation is carried out at pH values between 1 and 5. The solution is heated to the desired temperature and the catalysis system is either added all at once to the monomer mixture in the reaction vessel or it is partly introduced into the vessel together with the monomer mixture.

When graft polymerisation is carried out in nitric acid, the mixture of polymerisable reactants is dissolved together with a reducing agent in 3 to 10 times the quantity of acid and polymerisation is initiated by the addition of an oxidising agent at between 0 and 5° C. and is then continued at −10 to +30° C., preferably at 0° to 5° C. The reducing agents may, for example, be acetyl acetone, acetoacetanilide, barbituric acid, oxalic acid, formic acid or dibenzoylmethane. Suitable oxidising agents are, for example, persulphates. The graft polymers remain in solution so that they can either be spun directly or the polymer may be precipitated with water.

The graft polymers obtained are separated off by filtration under suction, washed and dried. They are obtained in good yields with K-values above 70 as required for commercial use by this process.

Films of the polymers prepared from approximately 15% dimethylformamide solution can be died satisfactorily with the acid dye Azilan Direct Blue A (Colour Index, vol. I, p. 1264). When the polymer is dissolved in DMF it undergoes little discoloration on heat treatment. Measurement of the dyeability was carried out by the following process:

To determine the dyeability, a thin film (250 to 500μ) of an approximately 15 to 20% dimethylformamide solution of polymer is prepared on a glass plate. This film is dried for 5 hours at 50 to 60° C. and then boiled for one hour with water to remove any dimethylformamide present in it. The film is then boiled for 1.5 hours with 100 parts by volume of the dye solution (1 part by weight of Azilan Direct Blue A and 8 parts by volume of 10% sulphuric acid dissolved in 1,000 parts by volume of water) and is then boiled again with distilled water for 1 hour.

The dry, dyed film is dissolved in 100 parts by volume of dimethylformamide and the extinction value of this solution is measured at 20° C. for a given wavelength.

The unit of measurement employed is the extinction per g. of film.

The parts by weight indicated in the following examples illustrating more particularly the invention are related to the parts by volume as kg. to litre.

EXAMPLE 1

13.6 parts by weight of a polyamide which has the recurrent structural unit $$-NH-(CH_2)_3-\overset{\overset{CH_3}{|}}{N}-(CH_2)_3-NH-CO-(CH_2)_4CO-$$

and an average molecular weight of 12,000 to 15,000 are dissolved with heating in 200 parts by volume of a mixture of methanol/water (1:1), and 10 parts by volume of dimethyl sulphate are added. After 30 minutes, the solution in the reaction flask is filtered, methanol is removed under vacuum and the solution is made up to 30 parts by volume with water. The pH thereof is 2. 52.5 parts by weight of acrylonitrile and 3.5 parts by weight of methyl acrylate are then added, the reaction mixture is heated to 50° C. and polymerisation is initiated by the addition of 0.7 part by weight of potassium persulphate and 0.7 part by weight of sodium meta-bisulphite. After a reaction time of 12 hours, the graft polymer produced is filtered off, washed with water until neutral and dried in a vacuum drying cupboard at 50° C. The yield is 56 parts by weight (72.6% of theoretical) of graft polymer of K-value 90 (Fikentscher, Cellulosechemie, 13, 58 (1932)).

Dyeability:

$$7.4 \text{ to } 7.6 \ \frac{\text{Extinction}}{\text{Original weight of film}} \ (\text{g.}^{-1}) \ (590 \ m\mu)$$

EXAMPLE 2

14 parts by weight of a polyamide which has the recurrent structural unit $$-NH-(CH_2)_3-\overset{\overset{CH_3}{|}}{N}-(CH_2)_2-\overset{\overset{CH_3}{|}}{N}-(CH_2)_3-NHCO(CH_2)_4CO-$$

and an average molecular weight of 10,000 to 12,000 are dissolved in a mixture of methanol/water (1:1) with heating, and after the addition of 13 parts by volume of dimethylsulphate, the reaction mixture is left to stand at 40 to 50° C. for 15 minutes. The filtered solution is concentrated by evaporating the methanol off under vacuum, and is then made up to 930 parts by volume with water. The pH of the reaction medium obtained is 2. 52.5 parts by weight of acrylonitrile and 3.5 parts by weight of methyl acrylate are added, the reaction mixture is heated to 50° C., and polymerisation is initiated with 0.7 part by weight of potassium persulphate and 0.7 part by weight of potassium metabisulphite. The temperature is maintained for 2.5 hours at 50° C. and the reaction mixture is then left to stand overnight. The polymer is then separated off by filtration under suction, and is washed and dried at 50° C. in a vacuum drying cupboard. Yield: 58.5 parts by weight (72% of the theoretical) of graft polymer of K-value 85.

Dyeability:

$$15.0 \text{ to } 15.5 \frac{\text{Extinction}}{\text{Original weight of film}} \text{ (g.}^{-1}\text{) (590 m}\mu\text{)}$$

EXAMPLE 3

10.5 parts by weight of the polyamide used in Example 2 are dissolved in 100 parts by volume of methanol/water, 9.7 parts by volume of dimethylsulphate are added and the reaction mixture is worked up in the same way as indicated in the earlier example The volume is made up to 930 parts by volume with water. The resulting pH is 2. 56 parts by weight of acrylonitrile and 3.5 parts by weight of methyl acrylate are used, and graft polymerisation is carried out at 50° C., using 0.7 part by weight of potassium persulphate and 0.7 part by weight of potassium metabisulphite as catalyst system. After 2.5 hours at 50° C., the reaction mixture is left to stand overnight, and the graft polymer is filtered, washed until neutral and dried. Yield: 61 parts by weight (77% of theoretical) of graft polymer of K-value 86.

Dyeability:

$$15.3 \text{ to } 15.7 \frac{\text{Extinction}}{\text{Original weight of film}} \text{ (g.}^{-1}\text{) (590 m}\mu\text{)}$$

EXAMPLE 4

14 parts by weight of the polyamide of N,N'-dimethyl-N,N' - di-(γ-aminopropyl)-ethylene-diamine and adipic acid, having an average molecular weight of 10,000 to 12,000, are dissolved in 100 parts by volume of methanol with heating, and 13 parts by volume of dimethylsulphate are added. After the reaction mixture has been left to stand for a short time at 40 to 50° C, the contents of the flasks are filtered and the methanol is removed under a vacuum until a viscous residue remains behind.

This is dissolved in 300 parts by volume of colourless, 65% nitric acid, and the mixture is cooled to 0 to 5° C. 52.5 parts by weight of acrylonitrile, 3.5 parts by weight of methyl acrylate, 0.05 part by weight of $$Fe(NO_3)_3 \cdot 9H_2O$$

dissolved in a little water, and 0.3 part by volume of acetyl acetone are then added. The pale reddish colour of iron acetyl acetonate develops. Polymerisation is initiated with 1 part by weight of ammonium persulphate which has been dissolved in about 5 parts by volume of water. After polymerisation for 20 hours at 0 to 5° C., the viscous solution is poured in a thin stream into 10 to 15 times its quantity of water. The polymer precipitates in the form of fine threads and is freed from most of the acid enclosed in it by changing the water several times. The polymer is broken up mechanically, and is again washed with a large quantity of water until it is neutral, and dried at 40 to 50° C. in a vacuum drying cupboard. Yield: 58 parts by weight (71.5% of the theoretical) of graft polymer which has a K-value of 84.

Dyeability:

$$14.2 \text{ to } 14.3 \frac{\text{Extinction}}{\text{Initial weight of film}} \text{ (g.}^{-1}\text{) (590 m}\mu\text{)}$$

The dyeability of an acrylonitrile copolymer containing 2.2% of 2-vinyl pyridine which had been incorporated by polymerisation was measured for comparison purposes. It amounts to $$13.2 \frac{\text{Extinction}}{\text{Initial weight of film}} \text{ (g.}^{-1}\text{) (590 m}\mu\text{)}$$

What we claim is:

1. Acrylonitrile graft copolymers comprising at least 50% by weight of acrylonitrile and, up to 10% by weight of another olefinically unsaturated comonomer containing acrylic or vinyl groups grafted on, 5 to 40% by weight of a linear polyamide which contains quaternised nitrogen atoms and which contains the recurrent structural unit $$-\underset{\underset{O}{\|}}{C}-R-\underset{\underset{O}{\|}}{C}-NH-R_1-NH-$$

in which R represents an alkylene radical containing 2 to 10 carbon atoms or a radical of the formula $$-(CH_2)_z-\underset{\underset{R_2}{|}}{\overset{R_3}{\underset{|}{N^{(+)}}}}-(CH_2)_z- \quad A^{(-)}$$

in which z is an integer of from 2 to 6, $R_2$ represents an alkyl radical containing 2 to 6 carbon atoms or a cycloalkyl radical, $R_3$ represents a methyl or ethyl group and $A^{(-)}$ represents a halide, sulphate or sulphonate anion and $R_1$ represents an alkylene radical containing 2 to 6 carbon atoms, or a radical of one of the following formulae $$-(CH_2)_3-\underset{\underset{R_3}{|}}{\overset{CH_3}{\underset{|}{N^{(+)}}}}-(CH_2)_3- \quad \text{or} \quad -(CH_2)_3-\underset{\underset{A^{(-)}}{|}}{\overset{CH_3}{\underset{|}{N^{(+)}}}}-(CH_2)_2-\underset{\underset{R_3}{|}}{\overset{CH_3}{\underset{|}{N^{(+)}}}}-(CH_2)_3- \quad A^{(-)}$$

in which $R_3$ and $A^{(-)}$ have the meanings indicated above, at least one quaternised nitrogen atom being present for every two amide groups, the polyamides having a molecular weight in the range of 1,000 to 50,000 and the graft polymer having a K value in the range of 70 to 110.

2. Acrylonitrile graft copolymers, said graft copolymers comprising at least 50% by weight of grafted acrylonitrile and up to 10% by weight of another olefinically unsatuarted comonomer containing acrylic or vinyl groups and comprising the recurrent structural unit:

$$-\underset{\underset{O}{\|}}{C}-R-\underset{\underset{O}{\|}}{C}-NH-\underset{\underset{X}{|}}{R_1}-NH-$$
$$\phantom{-C-R-C-NH-}\underset{X}{|}$$

in which R represents an alkyl radical containing 2 to 10 carbon atoms or a radical of the formula:

$$-(CH_2)_2-\underset{\underset{R_2}{|}}{\overset{R_3}{\underset{|}{N^{(+)}}}}-(CH_2)_2- \quad A^{(-)}$$

in which z represents a number from 2 to 6, $R_2$ repersents an alkyl radical containing 2 to 6 carbon atoms or a cycloalkyl radical, $R_3$ represents a methyl or ethyl group and $A^{(-)}$ represents a halide, sulphate or sulphonate anion, $R_1$ represents an alkylene radical containing 2 to 6 carbon atoms or a radical of the one of the following formulae:

$$-(CH_2)_z-\underset{\underset{R_3 A^{(-)}}{|}}{\overset{CH_3}{\underset{|}{N^{(+)}}}}-(CH_2)_3- \quad \text{or} \quad -(CH_2)_3-\underset{\underset{R_3}{|}}{\overset{CH_3}{\underset{|}{N^{(+)}}}}-(CH_2)_2-\underset{\underset{R_3}{|}}{\overset{CH_3}{\underset{|}{N^{(+)}}}}-(CH_2)_3-$$

in which $R_3$ and $A^{(-)}$ have the meanings indicated above, and X represents a side chain consisting of polymerised acrylonitrile and, another olefinically unsaturated comonomer containing acrylic or vinyl groups, the polyamide chain itself having a molecular weight in the range of 1,000 to 50,000 and the graft polymer having a K-value in the range of 70 to 110.

References Cited

UNITED STATES PATENTS

| | | | |
|---|---|---|---|
| 2,882,185 | 4/1959 | Valko | 260—78 |
| 3,297,786 | 1/1967 | Horowitz | 260—857 |
| 3,340,326 | 9/1967 | Faessinger | 260—857 |
| 3,413,378 | 11/1968 | Magat | 260—857 |

PAUL LIEBERMAN, Primary Examiner

U.S. Cl. X.R.

260—78

UNITED STATES PATENT OFFICE
CERTIFICATE OF CORRECTION

Patent No. 3,557,247      Dated January 19, 1971

Inventor(s) HELMUT ENGELHARD, FRANCIS EBNTZ, FERDINAND BODESHE AND GUNTHER NISCHK ET AL It is certified that error appears in the above-identified patent and that said Letters Patent are hereby corrected as shown below:

| Column | Line | Error |
|---|---|---|
| 4 | 51 | "30" should be ---930---. |
| Claim 2 | 2nd formula | "$(CH_2)_2$-N-$(CH_2)_2$" should be ---$(CH_2)_z$-N-$(CH_2)_z$--- |
| Claim 2 | 61 | "repersents" should be ---represents--- |
| Claim 2 | 3rd formula | "-$(CH_2)_z$..." should be ---$(CH_2)_3$...--- |

Signed and sealed this 26th day of October 1971.

(SEAL)
Attest:

EDWARD M. FLETCHER, JR.
Attesting Officer

ROBERT GOTTSCHALK
Acting Commissioner of Patents